United States Patent
Ishii

(10) Patent No.: US 10,303,155 B2
(45) Date of Patent: May 28, 2019

(54) NUMERICAL CONTROLLER HAVING MANUAL HANDLE FEED FUNCTION

(71) Applicant: FANUC CORPORATION, Minamitsuru-gun, Yamanashi (JP)

(72) Inventor: Tooru Ishii, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 15/655,235

(22) Filed: Jul. 20, 2017

(65) Prior Publication Data

US 2018/0024529 A1    Jan. 25, 2018

(30) Foreign Application Priority Data

Jul. 21, 2016   (JP) .................................. 2016-143508

(51) Int. Cl.
*G06F 19/00*   (2018.01)
*G05B 19/409*   (2006.01)
*G05B 19/402*   (2006.01)

(52) U.S. Cl.
CPC ......... *G05B 19/409* (2013.01); *G05B 19/402* (2013.01); *G05B 2219/35459* (2013.01); *G05B 2219/35461* (2013.01); *G05B 2219/35481* (2013.01)

(58) Field of Classification Search
CPC ......... H01H 2239/076; H01H 2300/03; H03K 17/964; H03K 2217/94089; Y02B 90/224; Y04S 20/14; Y10T 307/766; Y10T 307/786
See application file for complete search history.

(56) References Cited

U.S. PATENT DOCUMENTS

| | | | | |
|---|---|---|---|---|
| 5,579,463 A | * | 11/1996 | Takano | G01R 13/345 345/440 |
| 6,359,961 B1 | * | 3/2002 | Aufrichtig | A61B 6/022 348/E13.005 |
| 2009/0185516 A1 | * | 7/2009 | Chen | G05B 19/409 370/310 |
| 2009/0292390 A1 | | 11/2009 | Friedrich | |
| 2010/0269327 A1 | * | 10/2010 | Gray | B23Q 39/027 29/592 |
| 2015/0168944 A1 | * | 6/2015 | Sekine | G05B 11/26 318/562 |

FOREIGN PATENT DOCUMENTS

| | | |
|---|---|---|
| JP | 2000-305614 A | 11/2000 |
| JP | 2009-282973 A | 12/2009 |
| JP | 201518300 A | 1/2015 |
| JP | 2015005255 A | 1/2015 |

OTHER PUBLICATIONS

Notification of Reasons for Refusal for Japanese Application No. 2016-143508, dated Feb. 19, 2019, with translation, 11 pages.

* cited by examiner

*Primary Examiner* — Kidest Bahta
(74) *Attorney, Agent, or Firm* — RatnerPrestia

(57) ABSTRACT

A virtual manual handle is displayed on a screen of a display device of a numerical controller to simultaneously specify an operation amount and set a magnification of an axial movement amount with respect to this operation amount based on an operator's operation on the displayed manual handle.

3 Claims, 7 Drawing Sheets

VIRTUAL HANDLE OPERATION
(ROTATION OPERATION)

MAGNIFICATION SETTING OPERATION

VIRTUAL HANDLE OPERATION
(RIGHT-LEFT DRAG OPERATION)

MAGNIFICATION SETTING AREA x1 OPERATION
(ONE-POINT TOUCH DRAG OPERATION)

x10 OPERATION
(TWO-POINT TOUCH DRAG OPERATION)

x100 OPERATION
(THREE-POINT TOUCH DRAG OPERATION)

NUMERICAL CONTROLLER HAVING MANUAL HANDLE FEED FUNCTION

BACKGROUND OF THE INVENTION

1. Field of the Invention

The present invention relates to a numerical controller and, more particularly, relates to a numerical controller having a manual handle feed function which can easily set a magnification of an axial movement amount by operating a virtual manual handle displayed on a screen of a display device.

2. Description of the Related Art

Conventionally, when manually operating a machine, an operator uses a hardware operator's panel equipped to the machine or a numerical controller which controls the machine.

FIG. 8 is a view illustrating an example of a hardware operator's panel equipped to a machine of a conventional technique.

An operator's panel 40 illustrated in FIG. 8 includes a manual pulse generator 41, a manual feed button 42 and a setting switch 43. When causing a manual handle 41a to perform plus (+) rotation or minus (−) rotation, the manual pulse generator 41 causes the manual handle 41a to output a pulse signal according to this rotation. This pulse signal is a two-phase pulse for distinguishing a rotation direction, and is sent to a processor (not shown) via a bus (not shown) to move a tool. The manual feed button 42 includes feed buttons of plus and minus directions of respective axes of "+X", "−X", "+Y", "−Y", "+Z" and "−Z". Further, the setting switch 43 is a switch which sets a magnification of an axial movement amount with respect to an operation amount of the manual handle 41a.

Meanwhile, in recent years, touch-type pointing devices such as touch pads or touch panels are generally used as input units of numerical controllers. Japanese Patent Application Laid-Open No. 2000-305614 discloses a device which generates a manual pulse on software according to an input operation of a touch panel as a conventional technique which applies the touch-type pointing device to an operator's panel. Further, Japanese Patent Application Laid-Open No. 2009-282973 discloses an operator's panel which is not influenced by dust particles, liquids and/or gases surrounding the device by configuring a handle portion of an operator's panel as a touch panel.

In a case where a manual handle equipped to the operator's panel is operated to move an axis of the device, when a movement amount is great, an operator sets a large magnification of an axial movement amount with respect to an operation amount of the manual handle in advance, and performs an operation to rotate the manual handle. Further, when the movement amount is small, the operator sets a small magnification of the axial movement amount with respect to the operation amount of the manual handle in advance, and performs an operation to rotate the manual handle. When, for example, the axis of the machine is moved to a target position, and when the axis is at a position distant from the target position, the operator sets a large magnification of the axial movement amount with respect to the operation amount of the manual handle and performs an operation of rotating the manual handle to move the position of the axis to a proximity of the target position. Subsequently, the operator sets a small magnification of the axial movement amount with respect to the operation amount of the manual handle, and performs an operation of rotating the manual handle to adjust the position of the axis to the target position.

Thus, when the operator wants to change a setting of the magnification of the axial movement amount with respect to the operation amount of the manual handle while operating the manual handle to move the axis of the machine, the operator needs to temporarily stop the operation of rotating the manual handle and operates a switch for setting the magnification. Hence, there is a problem that the operator needs to repeat a bothersome operation procedure of an operation of rotating the manual handle every time the axis is manually moved, and an operation of pushing the setting switch. Further, there is a problem that it is necessary to additionally prepare the manual handle and a magnification setting switch in the operator's panels and therefore it is not possible to reduce development cost of the operator's panels. Furthermore, the techniques disclosed in Japanese Patent Application Laid-Open No. 2000-305614 and Japanese Patent Application Laid-Open No. 2009-282973 cannot solve the above problem.

SUMMARY OF THE INVENTION

It is therefore an object of the present invention to provide a numerical controller having a manual handle feed function which can easily set a magnification of an axial movement amount.

According to the present invention, a virtual manual handle is displayed on a screen of a display device of the numerical controller to simultaneously specify an operation amount and set a magnification of an axial movement amount with respect to this operation amount based on an operator's operation on the displayed virtual manual handle. The numerical controller according to the present invention sets a magnification of an axial movement amount with respect to an operation amount of the manual handle according to a touch position (a distance to a center position of the manual handle) of an operator's touch operation on the manual handle displayed on a touch panel.

A numerical controller according to the present invention controls a machine tool including at least one axis, and includes: a touch panel that can detect a touch operation on a predetermined operation area in a display area; a touch position detecting unit that specifies a drag operation in the operation area; an operation amount arithmetic operation unit that performs an arithmetic operation based on a start point position of the drag operation and an end point position of the drag operation, and specifies an operation amount of the drag operation and an operation direction of the drag operation; a magnification arithmetic operation unit that performs an arithmetic operation based on the drag operation, and determines a magnification of a movement amount of the axis with respect to the operation amount of the drag operation; a pulse generating unit that generates a pulse for moving the axis based on the operation amount of the drag operation and the operation direction of the drag operation specified by the operation amount arithmetic operation unit, and the magnification of the movement amount of the axis with respect to the operation amount of the drag operation determined by the magnification arithmetic operation unit; and a servo control unit that performs control to move the axis based on the pulse generated by the pulse generating unit.

The magnification arithmetic operation unit may perform an arithmetic operation on and determine the magnification of the movement amount of the axis with respect to the operation amount of the drag operation based on the start point position of the drag operation, or may perform an arithmetic operation on and determine the magnification of the movement amount of the axis with respect to the operation amount of the drag operation based on a number of touch points of the drag operation.

According to the present invention, it is possible to simultaneously perform a rotating operation and a magnification changing operation without interrupting an operation of a manual handle. Consequently, efficiency of an operator's axial movement operation of a machine improves. Further, it is not necessary to prepare a physical manual handle and operation switch, so that it is possible to reduce manufacturing cost of the numerical controller.

DETAILED DESCRIPTION OF THE PREFERRED EMBODIMENTS

A numerical controller according to the present invention causes a screen displayed on a display device to display a virtual manual handle (hereinafter referred to as virtual handle) as an operation area, detects an operator's operation of the virtual handle performed on the screen by a touch panel superimposed and arranged on the display device, and simultaneously specifies an operation amount based on a detection result and sets a magnification of an axial movement amount with respect to the operation amount.

Figure 1:
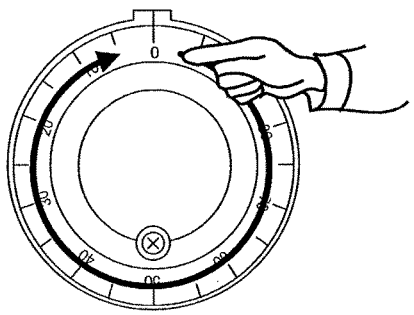
FIG. 1 is a view illustrating an example of a virtual handle operation according to the present invention.
Figure 1:
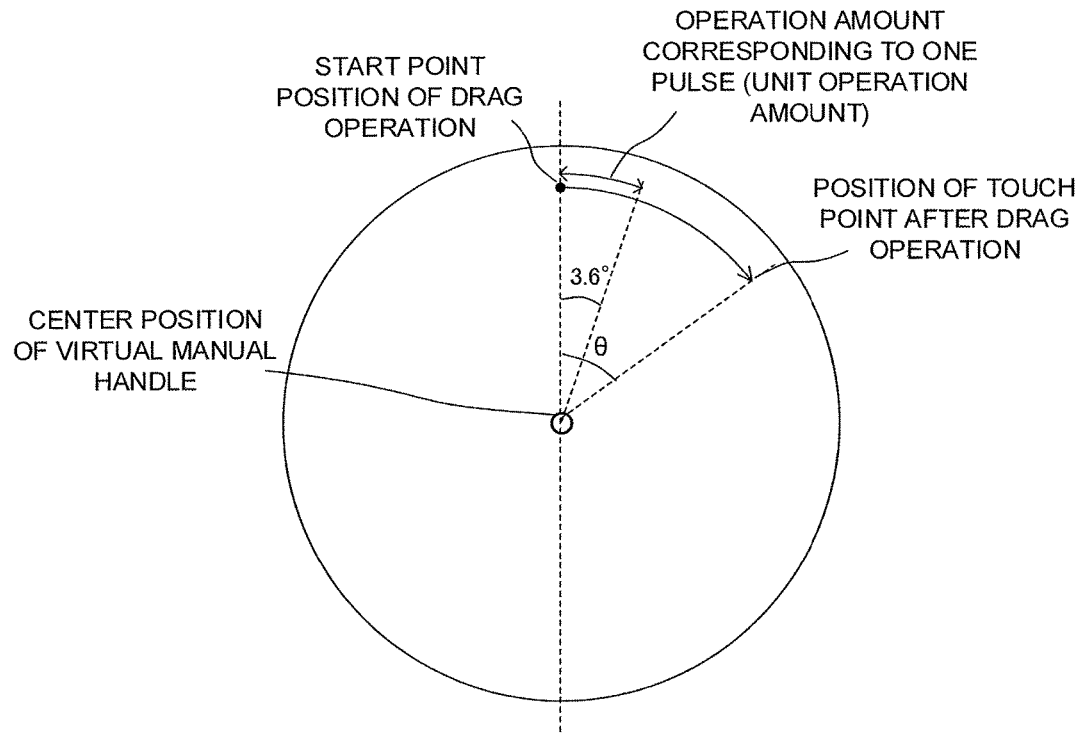

FIG. 1 illustrates an example of a basic operation of the virtual handle of the numerical controller according to one embodiment of the present invention.

An operator who operates the numerical controller of the present embodiment performs an operation (drag operation) of touching an image of the virtual handle displayed on the display device illustrated in FIG. 1 by his/her finger, and moving the touching finger on the image of the virtual handle in an arc fashion. The numerical controller according to the present embodiment detects the operator's operation of the virtual handle via the touch panel, and specifies the operation amount and an operation direction with respect to the virtual handle based on start point position of the drag operation and a position of a touch point after the drag operation.

In case of the circular virtual handle illustrated in FIG. 1, the operation amount is determined based on an angle θ formed by the start point position of the drag operation, a center position of the virtual handle, and the position of the touch point after the drag operation. For example, in a case where an operation amount obtained when the drag operation is performed to trace the virtual handle 360° along a circular arc is determined as an operation amount corresponding to 100 pulses, if θ is 3.6°, then it can be said that an operation corresponding to an operation amount of one pulse (referred to as a unit operation amount) is performed (note that a larger angle than an actual angle is drawn for ease of illustration in FIG. 1). Further, the operation direction may be determined based on a positional relationship between the start point position of the drag operation and the position of the touch point after the drag operation when viewed from a center position of the virtual handle (e.g., a forward direction when the start position is on the left and the touch point after the operation is on the right, and an opposite direction when the start point position is on the right and the touch point after the operation is the left when viewed from the center position of the virtual handle).

In this regard, a correspondence between the movement amount of the drag operation and the operation amount of the virtual handle is not limited to the above. The correspondence may be optionally determined according to use of the virtual handle or may be optionally changed based on a setting of the numerical controller.

Figure 2:
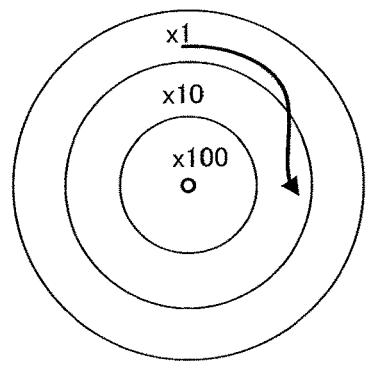
FIG. 2 is a view illustrating an example of an axial movement amount magnification setting operation of the virtual handle operation according to the present invention.
Figure 2:
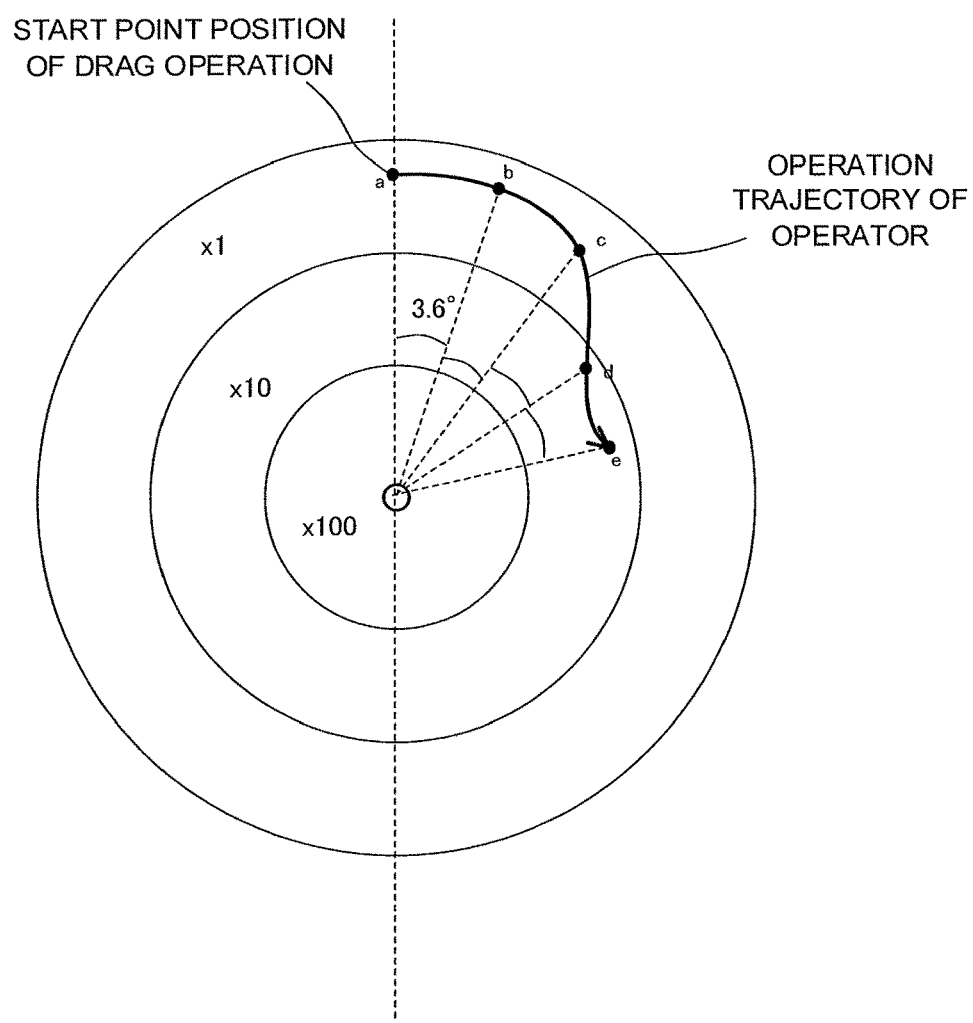

FIG. 2 illustrates an example of an operation of changing a magnification setting of the axial movement amount with respect to the operation amount of the virtual handle when performing the drag operation described with reference to FIG. 1.

When performing the drag operation described with reference to FIG. 1 on the image of the virtual handle displayed on the display device, the operator who operates the numerical controller according to the present embodiment can change the magnification setting of the axial movement amount with respect to the operation amount of the virtual handle by changing a distance between the position of the touch point and the center position of the virtual handle. In the example illustrated in FIG. 2, an entire area of the virtual handle is divided into three magnification setting areas based on a distance from the center position. The respective magnification setting areas are a one-time magnification setting area, a 10-times magnification setting area and a 100-times magnification setting area in order at a far side from the center position of the virtual handle. When the operator performs the drag operation on the virtual handle, the magnification setting of the axial movement amount with respect to the operation amount of the drag operation is determined according to a magnification setting area in which the start point position of the drag operation lies.

In the example illustrated in FIG. 2, when the operator starts the drag operation, the numerical controller stores a coordinate of a point a as the start point position of the drag operation and continues successively detecting touch points. At a point of time at which the touch point moves from the start point position of the drag operation by the unit operation amount (θ=3.6°), the numerical controller extracts a coordinate of a point b which is a position of the touch point at this point of time, as an end point position. In this case, the point a is in the one-time magnification setting area. Therefore, the numerical controller determines the magnification of the axial movement amount with respect to the operation amount as one time, and outputs a pulse amount (one pulse) obtained by multiplying by one time the operation amount (unit operation amount) of the drag operation from the point a stored as the start point position to the point b extracted as the end point position.

Next, the numerical controller stores the coordinate of the point b, extracted as the end point position, as a new start point position of the drag operation, and continues successively detecting touch points. At a point of time at which the touch point moves from the start point position (point b) of the drag operation by the unit operation amount ($\theta=3.6°$), the numerical controller extracts a coordinate of a point c which lies at a position of the touch point at this point of time, as an end point position. In this case, as the point b lies in the one-time magnification setting area, the numerical controller determines the magnification of the axial movement amount with respect to the operation amount as one time, and outputs a pulse amount (one pulse) obtained by multiplying by one time the operation amount (unit operation amount) of the drag operation from the point b stored as the start point position to the point c extracted as the end point position.

Subsequently, the numerical controller stores the coordinate of the point c, extracted as the end point position, as a new start point position of the drag operation, and continues successively detecting touch points. At a point of time at which the touch point moves from the start point position (point c) of the drag operation by the unit operation amount ($\theta=3.6°$), the numerical controller extracts a coordinate of a point d which lies at a position of the touch point at this point of time, as an end point position. In this case, (although the point d which is the end point position lies in the 10-times magnification setting area) the point c which is the start point position lies in the one-time magnification setting area. Therefore, the numerical controller determines the magnification of the axial movement amount with respect to the operation amount as one time, and outputs a pulse amount (one pulse) obtained by multiplying by one time the operation amount (unit operation amount) of the drag operation from the point c stored as the start point position to the point d extracted as the end point position.

Further, the numerical controller stores the coordinate of the point d extracted as the end point position as a new start point position of the drag operation, and continues successively detecting touch points. At a point of time at which the touch point moves from the start point position (point d) of the drag operation by the unit operation amount ($\theta=3.6°$), the numerical controller extracts a coordinate of a point e which lies at a position of the touch point at this point of time, as an end point position. In this case, the point d which is the start point position lies in the 10-times magnification setting area. Therefore, the numerical controller determines the magnification of the axial movement amount with respect to the operation amount is 10 times, and outputs a pulse amount (10 pulses) obtained by multiplying by 10 times the operation amount (unit operation amount) of the drag operation from the point d stored as the start point position to the point e extracted as the end point position.

In this regard, the entire area of the virtual handle is divided into the three magnification setting areas in FIG. 2. However, the number of magnification setting areas may be changed at a design level, and may be optionally changed based on a setting of the numerical controller. The respective magnification setting areas have the same width in FIG. 2. However, the respective magnification setting areas may have different widths, and, for example, the width of a frequently used magnification setting area may be widened.

Further, in the example in FIG. 2, the magnifications of magnification setting areas become lower as the magnification setting areas becomes distant from the center position of the virtual handle. The magnifications of magnification setting areas may become higher as the magnification setting areas becomes distant from the center position of the virtual handle. In case of the former, it is possible to provide advantages that it is easy to perform fine adjustment when the axis is near a target position, and it is easy to control a movement amount to move the axis at a high speed in case of the latter.

Hereinafter, a configuration of the numerical controller which achieves the above operations will be described.

Figure 3:
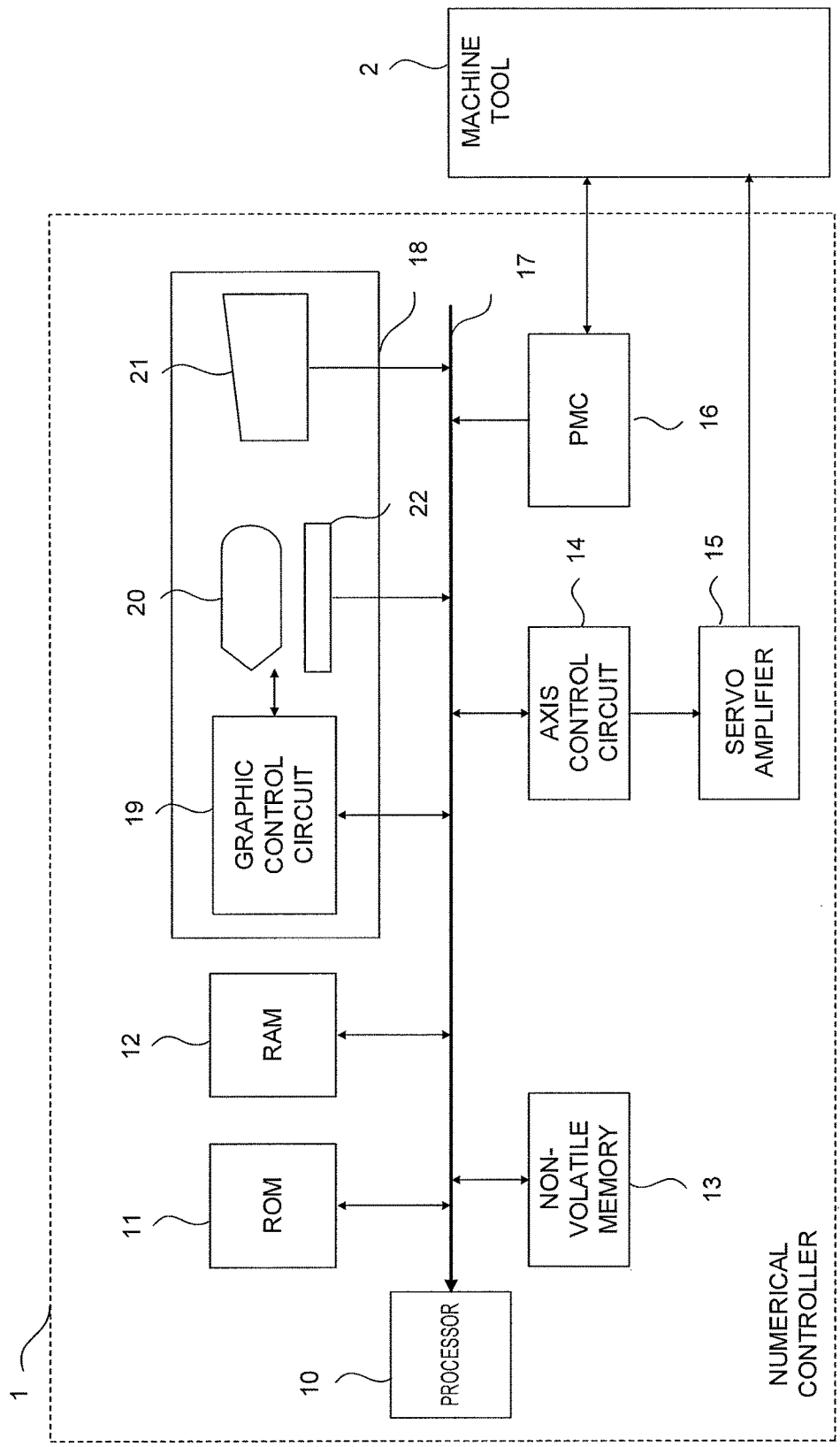
FIG. 3 is a hardware configuration diagram illustrating main units of the numerical controller according to one embodiment of the present invention.

FIG. 3 is a hardware configuration diagram illustrating main units of the numerical controller according to one embodiment of the present invention. A numerical controller 1 is mainly composed of a processor 10. The processor 10 controls the entire numerical controller 1 according to a system program stored in a ROM 11. An EPROM or an EEPROM is used for this ROM 11.

A DRAM or the like is used for a RAM 12, and temporary calculation data, display data, and an input/output signal are stored therein. A CMOS or a SRAM backed up by a battery (not shown) is used for a non-volatile memory 13, and parameters, a processing program and tool correction data which need to be held after a power supply is turned off are stored therein.

A LCD/MDI unit 18 is disposed on a front surface of the numerical controller 1 or at the same position as that of a machine operator's panel, and is used to display data and figures, input data and operate the numerical controller 1. A graphic control circuit 19 converts a digital signal such as numerical data and figure data into a display Raster signal and sends the digital signal to a display device 20, and the display device 20 displays these numerical value and figure. A liquid crystal display device is mainly used for the display device 20.

An input device 21 is composed of a keyboard including numerical keys, symbolic keys, character keys and function keys, and a pointing device such as a mouse, create and edit a processing program and operate the numerical controller.

A touch panel 22 has a function of detecting an operator's operation such as touch or drag. The touch panel 22 is disposed overlapping a screen of the display device 20, and the touch panel 22 can detect the operation performed by the operator on a software key, a software button or a software switch displayed on the screen of the display device 20. In this regard, the touch panel 22 and the display device 20 may be combined and configured as one device.

An axis control circuit 14 receives an axial movement command from the processor 10, and outputs the axial movement command to a servo amplifier 15. The servo amplifier 15 amplifies this movement command, drives a servo motor coupled to a machine tool 2 and controls a relative motion of a tool of the machine tool 2 and a work. In this regard, FIG. 3 illustrates only one axis. However, the numbers of the axis control circuits 14 and the servo amplifiers 15 correspond to the number of axes of the servo motor.

A programmable machine controller (PMC) 16 receives an M (auxiliary) function signal, an S (spindle speed control) function signal and a T (tool section) function signal from the processor 10 via a bus. 17. Further, the PMC 16 processes these signals according to a sequence program, outputs an output signal and controls a pneumatic device, a hydraulic device and an electromagnetic actuator of the machine tool 2. Furthermore, the PMC 16 receives various signals such as a button signal and a switch signal of the machine operator's panel in the machine tool 2, performs sequence processing and transfers a necessary input signal to the processor 10 via the bus 17.

In this regard, FIG. 3 does not illustrate a spindle motor control circuit and a spindle motor amplifier.

Figure 4:
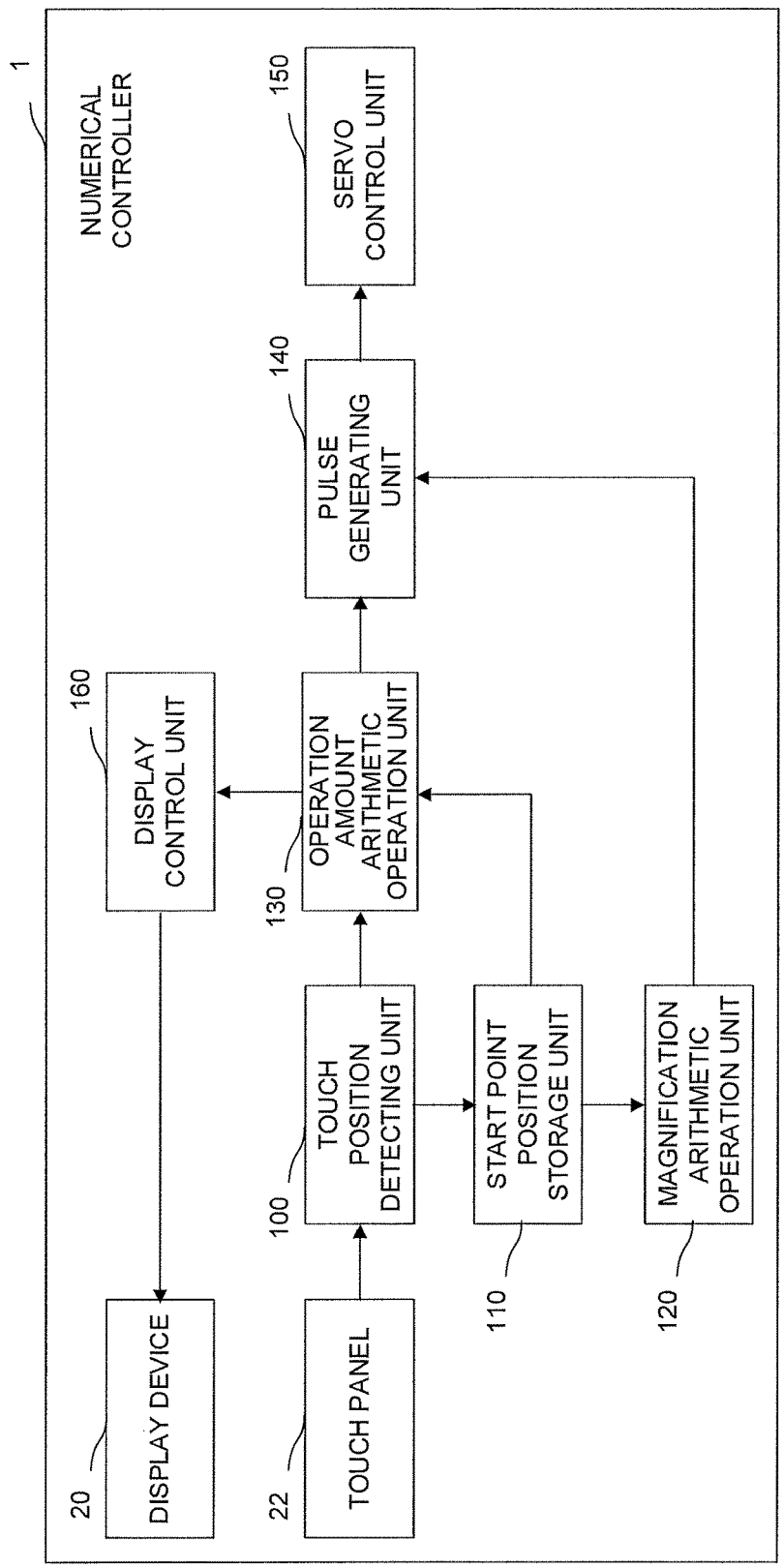
FIG. 4 is a schematic functional block diagram of the numerical controller according to one embodiment of the present invention.

FIG. 4 illustrates a schematic functional block diagram according to one embodiment in a case where a function of manual axial movement control of a virtual handle operation provided by the present invention is implemented on the numerical controller 1 illustrated in FIG. 3 according to the system program. Each function unit of the numerical controller 1 illustrated in FIG. 4 is realized by causing each unit of the numerical controller 1 to operate by causing the processor 10 illustrated in FIG. 3 to execute the system program, and providing each function.

The numerical controller 1 according to the present invention includes a touch position detecting unit 100, a start point position storage unit 110, a magnification arithmetic operation unit 120, an operation amount arithmetic operation unit 130, a pulse generating unit 140, a servo control unit 150 and a display control unit 160.

The touch position detecting unit 100 successively detects an operator's operation at a position on the touch panel 22 corresponding to a display position of the virtual handle displayed on the display device 20 by the display control unit 160 described below. When a drag operation (an operation of moving a touch point while touching the touch panel 22) starts, the touch position detecting unit 100 detects a start point position of the drag operation, and outputs the start point position to the start point position storage unit 110. Subsequently, the touch position detecting unit 100 successively detects the operator's drag operation with respect to the virtual handle, extracts a position of a touch point as an end point position at a point of time at which that the drag operation corresponding to the unit operation amount is performed from the start point position stored in the start point position storage unit 110 is detected, and outputs the extracted end point position to the operation amount arithmetic operation unit 130 described below. Further, when the pulse generating unit 140 described below finishes processing of generating a pulse corresponding to the drag operation from the start point position to the end point position, the touch position detecting unit 100 outputs the end point position as a new start point position of the drag operation to the start point position storage unit 110. The touch position detecting unit 100 continues detecting the operator's drag operation by repeating the above processing.

The start point position storage unit 110 stores in a memory (the RAM 12 or the like) (not shown) the start point position of the drag operation input from the touch position detecting unit 100.

The magnification arithmetic operation unit 120 determines a magnification setting of an axial movement amount with respect to an operation amount based on the start point position stored in the start point position storage unit 110, a display position of the virtual handle displayed on the display device 20 and setting information related to a magnification setting area set in advance to the memory (such as the non-volatile memory 13) (information indicating how an entire area of the virtual handle is divided, and which magnification is set to each area).

The operation amount arithmetic operation unit 130 performs an arithmetic operation on and specifies the operation amount and an operation direction of the drag operation from the start point position to the end point position as described with reference to FIG. 1, based on the start point position stored in the start point position storage unit 110, the end point position input from the touch position detecting unit 100, and the display position of the virtual handle displayed on the display device 20. The operation amount arithmetic operation unit 130 outputs information related to the specified operation amount and operation direction of the drag operation to the pulse generating unit 140 and the display control unit 160.

The pulse generating unit 140 generates the pulse related to movement of the axis based on the operation amount and the operation direction of the drag operation input from the operation amount arithmetic operation unit 130, and the magnification setting of the axial movement amount with respect to the operation amount input from the magnification arithmetic operation unit, and outputs the generated pulse to the servo control unit 150. The pulse generating unit 140 determines the number of pulses generated by multiplying the magnification setting of the axial movement amount with respect to the operation amount on the operation amount of the drag operation, and determines whether the movement direction of the axis is a positive direction or a negative direction based on the operation direction of the drag operation (a forward direction or a reverse direction).

Further, the servo control unit 150 controls each servo motor of the machine tool 2 based on the pulse input from the pulse generating unit 140.

The display control unit 160 executes control to display the virtual handle on the display device 20. The display control unit 160 displays an image of the virtual handle at a position set in advance, and changes the image of the virtual handle displayed on the screen based on the information related to the operation amount and the operation direction of the drag operation input from the operation amount arithmetic operation unit 130. When, for example, the virtual handle is a round handle shape, the display control unit 160 displays an animation which rotates the virtual handle according to the operator's operation.

Figure 5:
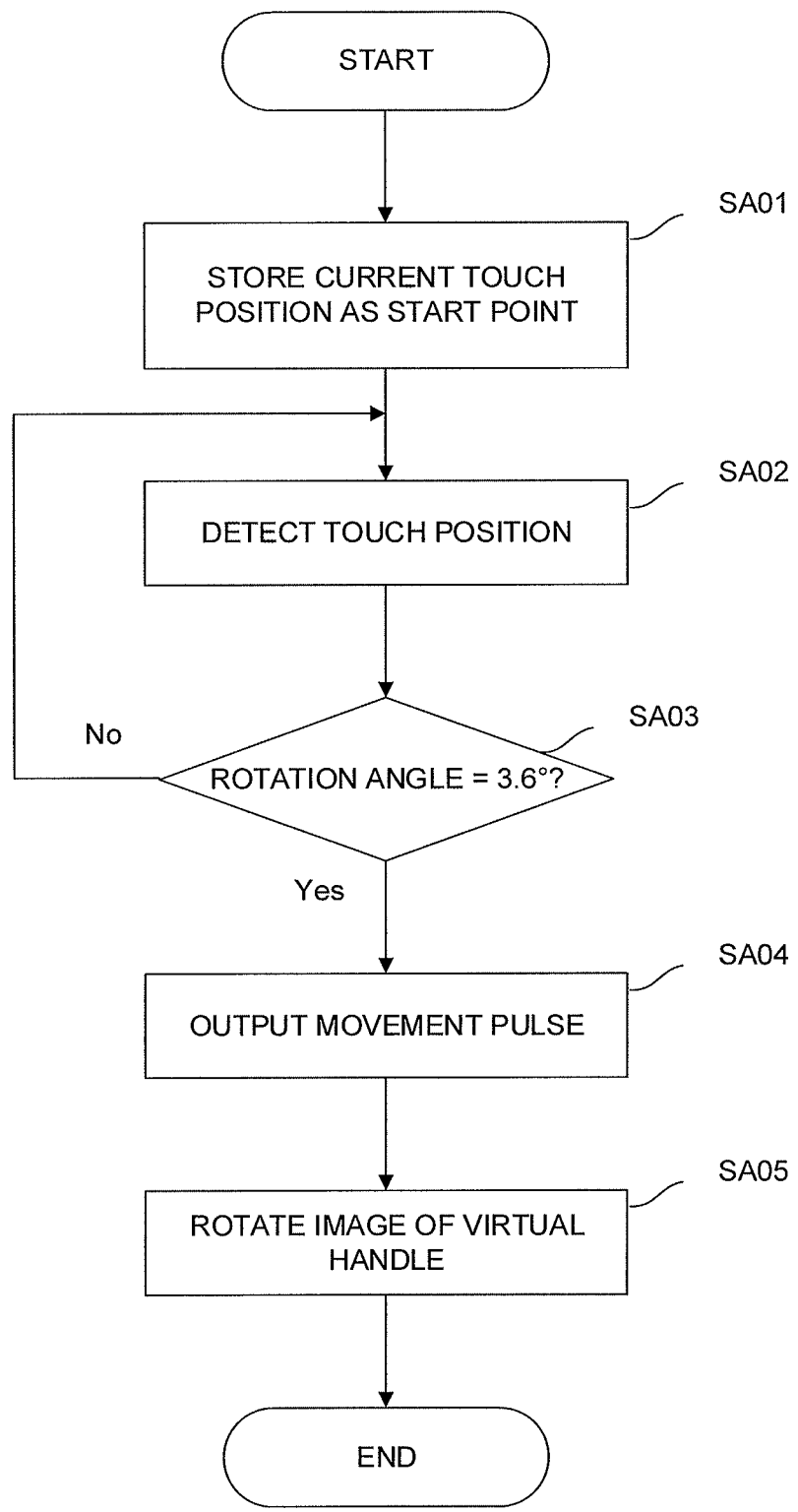
FIG. 5 is a schematic flowchart of processing executed by the numerical controller according to one embodiment of the present invention.

FIG. 5 is a flowchart of processing executed by the numerical controller 1 according to the present invention.

[Step SA01] The touch position detecting unit 100 successively detects a position of a touch point currently touched on the touch panel 22 by the operator, and outputs a position at a point of time at which the drag operation is started as the start point position to the start point position storage unit 110. The start point position storage unit 110 stores the position input from the touch position detecting unit 100 as the start point position.

[Step SA02] The touch position detecting unit 100 continues successively detecting the position of the touch point currently touched on the touch panel 22 by the operator, and temporarily stores the position of the touch point in the memory such as the RAM 12.

[Step SA03] The touch position detecting unit 100 determines whether or not the position of the operator's touch point on the touch panel 22 temporarily stored in step SA02 rotates by the unit operation amount (3.6°) when viewed from the center position of the virtual handle. The touch position detecting unit 100 obtains the position of the touch point at this point of time as the end point position, and processing proceeds to step SA04 when the position of the touch point rotates by the unit operation amount, and returns to step SA02 and continues the detection processing when the position of the touch point does not rotate by the unit operation amount.

[Step SA04] The operation amount arithmetic operation unit 130 specifies the operation amount and the operation direction of the drag operation based on the start point position stored in the start point position storage unit 110 and the end point position obtained in step SA03, and instructs the pulse generating unit 140 to generate the pulse based on the specified operation amount and operation direction of the drag operation. Further, the pulse generating unit 140 outputs the pulse to the servo control unit based on the instruction from the operation amount arithmetic operation unit 130.

[Step SA05] The operation amount arithmetic operation unit 130 instructs the display control unit 160 to update an indication based on the operation amount and the operation direction of the drag operation specified in step SA04. The display control unit 160 displays the animation which rotates the virtual handle displayed on the display device 20 based on the instruction from the operation amount arithmetic operation unit 130.

The embodiment according to the present invention has been described above. However, the present invention is not limited to an example of the above embodiment and can be optionally changed and carried out in various modes.

Figure 6:
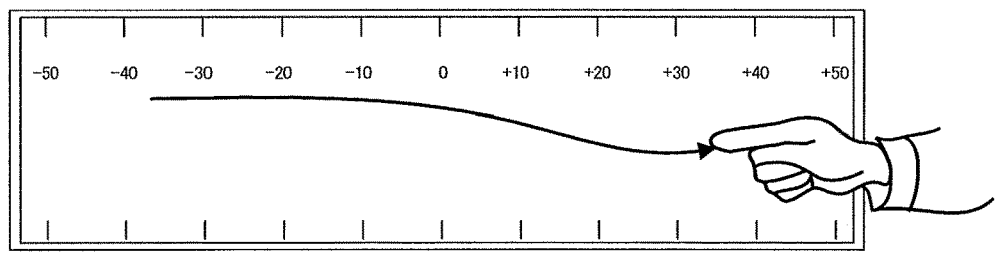
FIG. 6 is a view illustrating an example of a virtual handle operation according to another embodiment.
Figure 6:
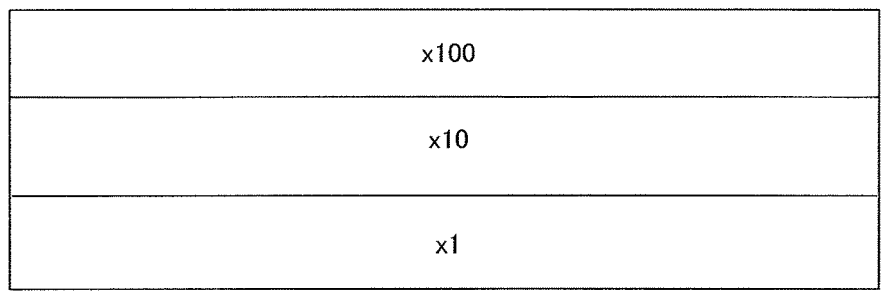
Figure 8:
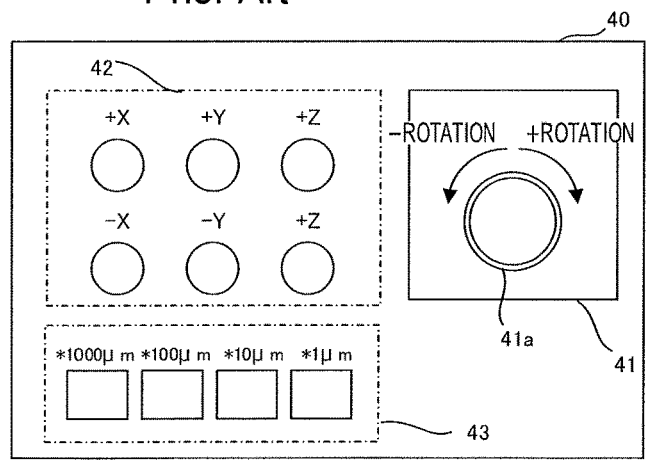
FIG. 8 is a view illustrating an example of a hardware operator's panel equipped to a machine of a conventional technique.

For example, according to the above embodiment, the virtual handle is displayed as the round handle shape. However, the virtual handle may also be displayed as a square shape as illustrated in, for example, FIG. 6. In this case, an operation amount may be determined based on an operation duration in a right-left direction of the drag operation, and an operation direction may be determined as a direction of the drag operation. Further, a plurality of magnification setting areas obtained by vertically dividing an entire area of the virtual handle may be provided as illustrated in FIG. 6, and magnifications may lower toward a lower side.

Figure 7:
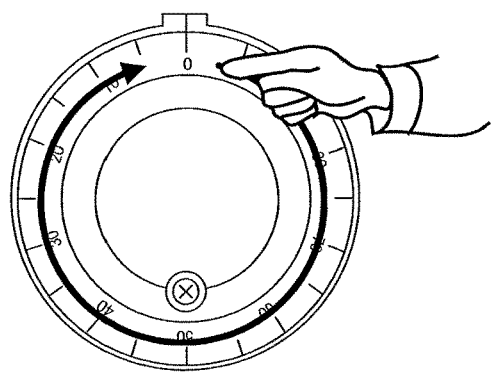
FIG. 7 is a view for explaining an embodiment where an axial movement amount magnification is determined based on the number of touches of a drag operation.
Figure 7:
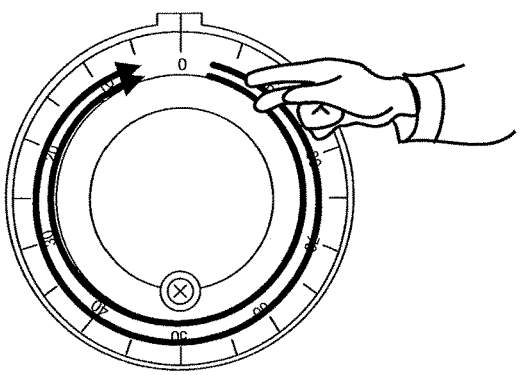
Figure 7:
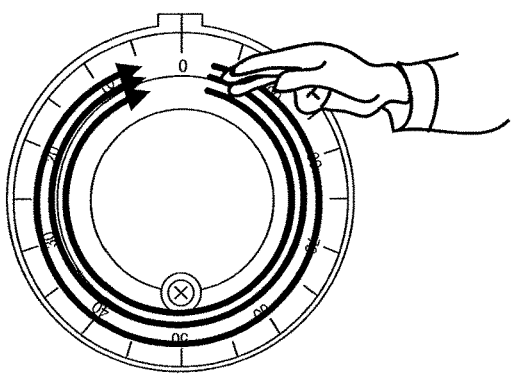

Furthermore, in the above embodiment, the entire area of the virtual handle is divided into a plurality of magnification setting areas to make it possible to change a magnification of an axial movement amount with respect to an operation amount based on a position of a touch point when the drag operation is performed. However, it may be possible to change a magnification setting of the axial movement amount with respect to the operation amount based on the number of touch points (the number of fingers) when the drag operation is performed as illustrated in, for example, FIG. 7. In this case, the touch position detecting unit 100 detects the number of touch points (the number of touching fingers), too, during the operator's drag operation, and the start point position storage unit 110 stores the number of touch points in addition to the start point position, so that it is possible to use the number of touch points stored in the magnification arithmetic operation unit 120 to determine the magnification setting. In this regard, a gravity center position of a plurality of touch points may be used for a touch position, and it may be regarded that the touch position does not change before and after the number of touch positions changes.

In a case where a magnification of an axial movement amount with respect to an operation amount is set by using the magnification setting area as described with reference to FIGS. 1 to 3, when the operator moves the axis of the machine tool 2 by operating the virtual handle displayed on the touch panel 22 while looking at the machine tool 2, the finger deviates halfway from the magnification setting area assumed by the operator during the operation. However, when a magnification of the axial movement amount with respect to the operation amount is set based on the number of touch points as described with reference to FIG. 7, it is possible to avoid such a problem.

In the above embodiment, every time the operator performs an operation corresponding to the unit operation amount by the drag operation, the operation amount and the operation direction of the drag operation and the magnification of the axial movement amount with respect to the operation amount are set. However, this processing may also be executed every time the drag operation corresponding to several unit operation amounts is performed, for example. By so doing, even though there is a problem that precision of axial movement with respect to the drag operation and readiness lower, a load of the numerical controller is reduced, which is useful to implement the function of the present invention on the numerical controller of low processing performance.

Further, as long as each function unit illustrated in the functional block diagram described with reference to FIG. 4 keeps each function, two or more function units may be implemented as one function unit, or one function unit may be divided as two or more function units and implemented. For example, the start point position storage unit 110 can be implemented as part of the touch position detecting unit 100.

The invention claimed is:

1. A numerical controller that controls a machine tool including at least one axis, the numerical controller comprising:
    a processor configured to:
    detect a touch operation on a predetermined operation area in a display area of a touch panel, wherein the predetermined operation area defines a virtual handle displayed in the display area;
    specify a drag operation for the virtual handle in the operation area of the touch panel;
    perform an arithmetic operation based on a start point position of the drag operation for the virtual handle and an end point position of the drag operation for the virtual handle, and specify an operation amount of the drag operation and an operation direction with respect to the drag operation for the virtual handle;
    perform an arithmetic operation based on the drag operation for the virtual handle, and determine a magnification of a movement amount of the axis with respect to the operation amount of the drag operation;
    generate a pulse for moving the axis of the machine tool based on the operation amount and operation direction of the drag operation for the virtual handle, and the magnification of the movement amount of the axis of the machine tool with respect to the operation amount of the drag operation of the virtual handle; and
    control, via a servo controller, movement of the axis of the machine tool based on the generated pulse.

2. The numerical controller according to claim 1, wherein the magnification of the movement amount of the axis with respect to the operation amount of the drag operation is based on the start point position of the drag operation for the virtual handle.

3. The numerical controller according to claim 1, wherein the magnification of the movement amount of the axis with respect to the operation amount of the drag operation is based on a number of touch points of the drag operation for the virtual handle.

* * * * *